(12) United States Patent
Gammer et al.

(10) Patent No.: US 10,670,217 B2
(45) Date of Patent: Jun. 2, 2020

(54) ILLUMINATION DEVICE WITH LIGHT SOURCE

(71) Applicant: OSRAM GmbH, Munich (DE)

(72) Inventors: Christian Gammer, Traitsching (DE); Benjamin Dollinger, Regensburg (DE)

(73) Assignee: OSRAM GmbH, Munich (DE)

(*) Notice: Subject to any disclaimer, the term of this patent is extended or adjusted under 35 U.S.C. 154(b) by 0 days.

(21) Appl. No.: 16/182,656

(22) Filed: Nov. 7, 2018

(65) Prior Publication Data

US 2019/0145598 A1 May 16, 2019

(30) Foreign Application Priority Data

Nov. 10, 2017 (DE) .......................... 10 2017 220 056

(51) Int. Cl.
| | |
|---|---|
| *F21S 41/32* | (2018.01) |
| *F21S 45/70* | (2018.01) |
| *F21S 41/176* | (2018.01) |
| *F21S 41/675* | (2018.01) |
| *F21S 41/16* | (2018.01) |
| *H04N 5/232* | (2006.01) |

(52) U.S. Cl.
CPC ............. *F21S 41/321* (2018.01); *F21S 41/16* (2018.01); *F21S 41/176* (2018.01); *F21S 41/675* (2018.01); *F21S 45/70* (2018.01); *H04N 5/23261* (2013.01)

(58) Field of Classification Search
CPC ........ F21S 41/16; F21S 41/321; F21S 41/675; H04N 5/23261; G03B 21/008; G02B 26/0833
See application file for complete search history.

(56) References Cited

U.S. PATENT DOCUMENTS

| | | | | |
|---|---|---|---|---|
| 9,658,447 | B2* | 5/2017 | Bhakta | ............... G02B 26/0833 |
| 9,915,820 | B2* | 3/2018 | Kurtz | ................... H04N 5/7458 |
| 10,136,113 | B2* | 11/2018 | Katsumata | ........... H04N 9/3158 |
| 2004/0263802 | A1* | 12/2004 | Seki | ....................... G03B 21/26 |
| | | | | 353/99 |
| 2005/0248737 | A1 | 11/2005 | Engle | |
| 2018/0142856 | A1* | 5/2018 | Reinprecht | ........ G02B 26/0833 |

FOREIGN PATENT DOCUMENTS

DE  102016001915 A1  8/2017

OTHER PUBLICATIONS

German Search Report based on application No. 10 2017 220 056.1 (9 pages) dated Aug. 20, 2018 (for reference purpose only).

* cited by examiner

*Primary Examiner* — Peggy A Neils
(74) *Attorney, Agent, or Firm* — Edward S. Podszus (57) ABSTRACT

An illumination device includes a light source, a micromirror array having micromirror actuators, switchable in each case between an on state and an off state, an optical unit, and an optical sensor unit. The light is guided onto the array and proportionally at a respective one of the actuators in an on tilt position is reflected to an illumination application, and in an off tilt position is reflected to the optical sensor unit. The device is configured such that a first actuator, which is in an on state in the on tilt position, is brought to the off tilt position for a first test interval, and a second actuator, which is in an off state in the off tilt position, remains in the off tilt position for the first test interval. A radiation power incident on the sensor unit during the first test interval is detected by the sensor unit.

16 Claims, 2 Drawing Sheets

ILLUMINATION DEVICE WITH LIGHT SOURCE

CROSS-REFERENCE TO RELATED APPLICATION

This application claims priority to German Patent Application Serial No. 10 2017 220 056.1, which was filed Nov. 10, 2017, and is incorporated herein by reference in its entirety and for all purposes.

TECHNICAL FIELD

Various non-limiting embodiments relate generally to an illumination device including a light source for emitting illumination light, a micromirror array and an illumination optical unit.

BACKGROUND

A micromirror array is constructed from a multiplicity of micromirrors arranged in matrix form, said micromirrors being switchable and thus tillable independently of one another as actuators. In projection applications, such micromirror arrays are used as image generators. Each micromirror actuator thus corresponds to a pixel, wherein, depending on the tilt position, the light of a specific color (e.g. red, green or blue) that is incident thereon at respective points in time is forwarded onto the projection surface for the purpose of imaging in an on tilt position, or is guided onto an absorber (Beam Dump) and "annihilated" in an off tilt position.

SUMMARY

An illumination device includes a light source, a micromirror array having micromirror actuators, switchable in each case between an on state and an off state, an optical unit, and an optical sensor unit. The light is guided onto the array and proportionally at a respective one of the actuators in an on tilt position is reflected to an illumination application, and in an off tilt position is reflected to the optical sensor unit. The device is configured such that a first actuator, which is in an on state in the on tilt position, is brought to the off tilt position for a first test interval, and a second actuator, which is in an off state in the off tilt position, remains in the off tilt position for the first test interval. A radiation power incident on the sensor unit during the first test interval is detected by the sensor unit.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various non-limiting embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

Various embodiments specify a particularly advantageous illumination device.

In various non-limiting embodiments, an illumination device firstly includes an optical sensor unit, to which the micromirror actuators reflect the light in their respective off tilt position. In this regard, part of the illumination light may be used for monitoring or checking the micromirror array or the light source or else the optical/electrical functionality generally. In various non-limiting embodiments, it is the case that not simply all micromirror actuators are measured, which are in the off tilt position anyway at a respective point in time, rather a specific configuration or a pattern of micromirror actuators is measured in a manner decoupled from the instantaneously generated light distribution.

This decoupling is manifested e.g. in the fact that within an operating period a first micromirror actuator in the on state, is brought to the off tilt position (for a short time) and a second micromirror actuator in the off state, remains in the off tilt position in the meantime. During this test interval, which is short in relation to the operating period, both the first and the second micromirror actuator thus reflect to the sensor unit, that is to say that they are measured, even if these micromirror actuators are used differently with regard to the light distribution in this operating period.

The detachment from the light distribution reproduced in the operating period is advantageous insofar as a specific test pattern may be checked, that is to say that e.g. the micromirror array may be systematically "scanned" with a plurality of successive test intervals. Conversely, if only ever the positive or negative of the light distribution were measured, some of the micromirror actuators could influence the monitoring more than proportionally frequently, and others very infrequently or even not at all, with the result that a possible fault might remain undiscovered at least for a relatively long period of time.

Various non-limiting embodiments are found wherein the presentation does not always differentiate specifically between device and method or use aspects. By way of example, if an illumination device configured for specific operation is described, this may also be read as a description of a corresponding operating method or associated uses, which also holds true conversely.

The "operating periods" are also referred to as frames and are dimensioned in accordance with the so-called frame update rate; the latter may be e.g. 60 Hz (see below regarding further details or possibilities). The frame update rate prescribes the clocking with which the light distribution changes or may be altered. Accordingly, a respective micromirror actuator is either in the on state or in the off state over a respective operating period, that is to say that, figuratively speaking, the assigned pixel is switched on or off (gray levels are also possible, see below).

For operation in accordance with the main claim, in the operating period, that is to say within a frame, on the one hand, the first micromirror actuator in the on state, is brought to the off tilt position for the test interval, and the second micromirror actuator in the off state in this frame, remains in the off tilt position. This relates firstly to a frame, that is to say that over the course of operation, for generating a test pattern or a pattern sequence, situations may also occur, of course, in which (randomly) the correct actuators (required for the pattern) are already in the corresponding tilt position on account of the currently generated light distribution. Conversely, however, during other operating periods it will also be repeatedly necessary to muster actuators respectively in the on state and in the off state in order to generate the desired pattern in a manner detached from the instantaneous light distribution.

The test patterns may be e.g. successive row or column patterns or else checkered or more complex patterns which jointly fill the micromirror array over the course of time. This illustrates why conversely the patterns in any case do not always arise as negative or positive of the instantaneous light distribution. For elucidation, one application may be in the area of adaptive road illumination (see below), such that in a "typical" light distribution it is possible to define a light finger on the road, which light finger is correspondingly trimmed e.g. in the case of traffic traveling ahead or oncoming traffic. A comparatively artificial column/row or checkered pattern will in any case not likely be found in the light distribution.

In accordance with the main claim, the decoupling firstly concerns the first and second actuators; as a non-limiting example, the actuators are associated in each case with a group, that is to say that a plurality of actuators are measured jointly in a respective test interval. Depending also on the generated pattern or the number of actuators overall, e.g. at least 2, 5, 10, 20, 30, 40, 50, 60, 70, 80, 90 or 100 actuators may be measured jointly per test interval, with possible upper limits (independent thereof), which also depend on the size of the array, at e.g. at most $1\times10^8$, $1\times10^7$, $1\times10^6$, 100 000, 10 000, 5000 or 1000 actuators per group and test interval. Relative to the number of actuators of the array overall, e.g. 0.1%, 0.5% or 1% of the actuators may be measured jointly per group and test interval, with possible upper limits (independent thereof) at e.g. at most 20%, 10% or 5%. Generally, "a" and "an" in the context of this description should be interpreted as the indefinite article and thus always also as "at least one".

How many of the actuators measured in a respective group in a respective test interval are set analogously to the first actuator or analogously to the second actuator also depends specifically on the ratio between the instantaneously generated light distribution and the test pattern. In general, however, a group may include e.g. at least 5, 10, 15 or 20 actuators which are brought to the off tilt position for the first test interval analogously to the first actuator, and likewise at least 5, 10, 15 or 20 actuators which are in the off state and remain in the off tilt position for the first test interval analogously to the second actuator. Upper limits (independently thereof) may be in each case at e.g. at most $1\times10^7$, $1\times10^6$, 100 000, 10 000, 1000 or 500.

The illumination optical unit is assigned to the micromirror array (also called "array" hereinafter) in such a way that the illumination light guided through the illumination optical unit by different micromirror actuators ("actuators") in the on tilt position passes in different spatial directions. The light distribution in the position space in the array plane is first translated into a light distribution in the angle space of the far field. By selectively switching on/off a respective actuator, it is accordingly possible selectively to supply a respective spatial direction or a solid angle range with illumination light, or not actually to supply it therewith.

A vehicle that is traveling ahead or is oncoming and is detected by e.g. a camera or some other sensor system of the motor vehicle may then be excluded from the light cone e.g. in a targeted manner by the corresponding actuators being switched off (brought to the off tilt position). This is intended to illustrate one field of application but is not intended to restrict the generality of the concept of the invention.

Monitoring the light source may be of interest, for example, in order to be able to identify and avoid an undesired emergence of radiation having a high radiance in the case of a fault, for instance in the case of a damaged light source. The light source may include e.g. a pump radiation source and a phosphor element for at least proportionally converting the pump radiation (see below in detail), and the pump radiation, which is generally focused, could emerge toward the illumination application in the case of a damaged, for instance fractured/cracked, phosphor element. This may present a considerable photobiological risk with respect to the illumination application, for instance for an observer this may result in damage to the retina and, in the worst case, loss of sight. In the case of the illumination device according to the description, e.g. an evaluation unit that ascertains an irregularity in the measurement signal of the sensor unit may cause a control unit of the light source to bring about at least a reduction of power or else a complete switch-off.

In various non-limiting embodiments, in the case of motor vehicle illumination, firstly, particularly stringent safety requirements may arise; secondly, the light source may also be subject to a particular requirement profile, for instance on account of the temperature fluctuations, mechanical vibrations, etc. In the case of a light source with phosphor element, the latter may occasionally also detach in its entirety from a mechanical mount or from a carrier, for instance on account of a failing joining connection layer. In this case, too, the pump radiation could propagate in a focused fashion toward the illumination application. Moreover, undesired/dangerous propagation of radiation also need not necessarily result from a defect of the light source itself, however, but rather may e.g. also be caused by a defect of one of the optical elements for beam guiding.

The illumination optical unit may generally also include a reflector; as a non-limiting example, an exclusively refractive illumination optical unit. In general, a non-imaging illumination optical unit is also conceivable, but it may be imaging. The illumination optical unit may include e.g. a lens, e.g. a converging lens, wherein the lens may also be constructed from a plurality of individual lenses (arranged successively in regard to the transillumination) in the manner of a lens system. In various non-limiting embodiments, an arrangement is provided such that the illumination optical unit images the micromirror array, that is to say the actuators, into infinity.

Independently of the constitution of the illumination optical unit in specific detail a respective actuator in its on tilt position reflects the illumination light incident thereon from the light source through or via the illumination optical unit toward the illumination application. In its off tilt position, by contrast, said actuator reflects the illumination light into an off beam, which in the prior art is guided onto a Beam Dump. The off beam lies alongside the illumination optical unit (a more extensive deflection is also possible), that is to say, unlike the on beam, does not pass toward the illumination application. In practice, between the on beam and the off beam there may also be a further, so-called transient beam. The latter may correspond to a non-deflected state of the actuators, the so-called Transient Flat State. The latter is not utilized further in any case in projection applications, and in the present case, too, exclusion of the transient beam is possible (cf. the exemplary embodiment), albeit not mandatory.

The "micromirror array" (also called Digital Micromirror Device, DMD) may include e.g. at least 10, 100, 500, 1000, 5000, 10 000 or 30 000 actuators and (independently thereof) e.g. not more than $1\times10^8$, $1\times10^7$ or $1\times10^6$ actuators (with increasing preference in each case in the order mentioned). The actuators may be part of the same semiconductor component (chip). They are not necessarily switchable completely independently of one another, but rather may e.g. also already be combined in groups in chip terms. That is to say that e.g. a plurality of actuators arranged alongside one another may also jointly supply a solid angle range, or indeed not, that is to say then all be switched on or off. With regard to specific operating modes as well, such as e.g. high beam, low beam, daytime running light, etc., already original combination in groups is also possible.

The "optical sensor unit" includes at least one optical sensor, which may generally also be a CCD or CMOS image sensor; as a non-limiting example, a photodiode as sensor (see below). The sensor has a sensitive sensor area; the radiation incident thereon is converted into a sensor signal. An at least qualitative, e.g. quantitative, conclusion about the radiation power is thus possible. A non-limiting example is an arrangement such that from each actuator in its off tilt position at least part of the illumination light guided via it is incident on the sensor unit. In the off beam, for example, an optical unit may also be provided, which may be configured e.g. in a non-imaging fashion, e.g. as a light guide, or else in an imaging fashion, for instance as a converging lens or corresponding lens system.

The radiation power of at least part of the illumination light guided to the sensor unit by the actuators in the off tilt position thereof is then detected in the test interval. That is to say that it is not necessary to measure the entire illumination light guided via them in the off tilt position; in order to protect the optical sensor unit, as a non-limiting example, filtering upstream of the optical sensor unit. By way of non-limiting example, a neutral filter may be arranged in the off beam or, by means of a dichroic mirror, the illumination light may be guided partly onto the sensor unit and partly alongside, e.g. onto an absorber (Beam Dump).

Insofar as mention is made generally of the fact that the illumination device "is configured [for specific] operation", this means that a control unit is provided and the corresponding sequences are stored therein. Such a control unit will generally have a digital component, for instance a microcontroller. The latter may be programmed for carrying out the operational sequences described and address the array either directly or else via an interposed driver circuit. In various non-limiting embodiments, via a corresponding logic unit (e.g. a microcontroller), a controller of the light source is then also addressed or the light source is addressed directly. An evaluation unit that performs the evaluation of the radiation power measurement may be provided in an integrated or else separate fashion, wherein in the latter case, preference is then given to implementing at least data exchange with the control unit. The evaluation unit and a controller of the light source may be at least coupled and possibly also integrated in order to instigate a power reduction or switch-off if required in the case of a fault.

In various non-limiting embodiments, the time duration of the test interval is in a ratio of at most 1:5, with increasing preference in the order mentioned at most 1:10, 1:15, 1:20, 1:25, 1:30, 1:35, 1:40, 1:45 or 1:50, with respect to the time duration of the operating period. A corresponding limitation may be advantageous insofar as the actual image impression or the impression that an observer of the generated light distribution has is not then disturbed. The test pattern or the negative thus appears only so briefly that this is below the threshold of human perception. Possible lower limits of the ratio of test interval to operating period may be e.g. at least 1:400, 1:350, 1:300, 1:250, 1:200, 1:150 or 1:100; e.g. the switching frequencies of the actuators may become limiting.

Generally, the test interval is "accommodated" in the operating period, that is to say lies completely in the operating period and is shorter than the latter in this case. In general, of course, this does not preclude the same test pattern furthermore or once again being measured in a succeeding operating period, although this is then regarded by definition as a further test interval of the further operating period. Preference is given anyway to changing the test patterns from operating period to operating period or even also within a respective operating period, see below in detail.

In various non-limiting embodiments, the operating periods each have a time duration of at least 5 ms, with further and, advantageously, at least 8 ms or 12 ms. Exemplary upper limits (independently thereof) may be, with increasing preference in the order mentioned, at most 100 ms, 80 ms, 60 ms, 50 ms, 40 ms, 30 ms, 20 ms or 18 ms. Around 15 ms may be provided, which corresponds to a frequency of approximately 66 Hz. Relative to the operating frequency, upper limits may be e.g. 200 Hz, 150 Hz, 100 Hz, 90 Hz, 80 Hz or 70 Hz, with possible lower limits (independent thereof) at e.g. at least 10 Hz, 20 Hz, 30 Hz, 40 Hz or 50 Hz. Around 60 Hz may be provided. These indications should also expressly be regarded as a definition of "operating period".

In various non-limiting embodiments, the test intervals each have a time duration of at most 500 μs, with increasing preference in the order mentioned at most 400 μs, 300 μs or 200 μs. A corresponding limitation makes it possible to prevent a disturbing influencing of the image or light distribution content. In principle, the shortest possible test intervals may be of interest, but technical constraints mean that lower limits may be e.g. at least 50 μs, 75 μs, 100 μs, 125 μs or 150 μs.

In various non-limiting embodiments, the illumination device is configured in such a way that the light source is switched off temporarily in the course of operation. Within a frame or between two frames said light source is thus switched off and then on again (in the same or succeeding frame). A corresponding time duration for which the light source is then switched off will generally be (significantly) shorter than the operating periods, e.g. correspond at most to 0.5, 0.4 or 0.3 times the operating period (with possible lower limits at e.g. at least 0.05 or 0.1 times the operating period). The switch-off may be thermally motivated, for example, that is to say help to reduce an average loading of the actuators over the course of time.

In various non-limiting embodiments, the light source is switched off temporarily during the first operating period, but here outside the first test interval. Here the light source is not switched off over the entire time duration outside the first test interval, but rather is switched proportionally on and proportionally off in the remaining operating period (apart from the first test interval). Within the first operating period, the first actuator in the on state, is then arranged in the off tilt position proportionally outside the first test interval as well.

In a simplified summary, during the first operating period the first actuator is still in the off tilt position a little longer than necessary for the measurement. This may be motivated by a protective or lifetime-conserving mode of operation, namely preventing "baking". However, since the first actuator is actually in the on state in the first operating period, if said first actuator is then arranged in the off tilt position, the light source may be switched off at least temporarily outside the first test interval. A (significant) impairment of contrast, for example, may thus be prevented. Generally, temporarily switching off the light source may also be motivated by the energy efficiency or thermal budget of the light source. Even though a corresponding procedure has been described with reference to the first actuator in the present case, it may also be provided for all the other actuators. In a respective operating period and in this case outside the respective test interval, e.g. it is also possible momentarily to invert the complete mirror arrangement, that is to say to set the negative with respect to the instantaneously generated light distribution (as positive).

In various non-limiting embodiments, a third micromirror actuator in the on state in the on tilt position in the first operating period, remains in the on tilt position for the first test interval, and a fourth actuator in the off state, is brought to the on tilt position for the first test interval. The third and fourth actuators are thus not measured in the first test interval, that is to say are not part of the group in which the first and second actuators are found.

If the actuators of the array with their respective tilt positions in their entirety are regarded as test pattern, the third and fourth actuators are however part of the generated pattern insofar as they are a negative with respect to the measured group as positive. The third and fourth actuators may be measured subsequently or else previously in a different group, either jointly or in each case in a dedicated group. As in the case of the first and second actuators, in the case of the third and fourth actuators, too, generally a plurality of actuators are moved or arranged analogously in the test interval. That is to say that there may be e.g. at least 5, 10, 15 or 20 actuators brought to the on tilt position analogously to the fourth actuator, and likewise e.g. at least 5, 10, 15 or 20 actuators which remain in the on tilt position analogously to the third actuator. Possible upper limits also depend on the size of the array and, in the case of a large array, may e.g. also be at most $1\times10^8$, $1\times10^7$ or $1\times10^6$, but lower upper limits of e.g. at most 100 000, 10 000 or 5000 are possible.

Generally, a or the claimed actuator(s) may be regarded e.g. as in the "on state" in the claimed operating period(s) if the actuator is arranged in the on tilt position in the corresponding operating period over at least 50% of the time duration for which illumination light is present. Conversely, the "off state" is present if the off tilt position is adopted over at least 50% of said time duration. In the case of both definitions, e.g. at least 60%, 70% or 80% may be advantageous as further lower limits (in each case 100% may also be possible, but upper limits may e.g. also be 95% or 90%).

As already mentioned in the introduction, the operation at issue in the present case relates firstly to one or some operating periods (frames), not necessarily to the entire operating duration, and it also does not necessarily concern all of the actuators. Thus, over the course of operation there may e.g. indeed be situations in which one/some of the actuators are "gray" and cannot conclusively be ascribed to the on state or the off state (and these actuators are then nevertheless concomitantly measured or "masked out" as part of the pattern). On the other hand, however, there will always also be operating periods in which one/some of the actuators are unambiguously in the on state or in the off state and are moved or measured as claimed (or not actually measured).

In various non-limiting embodiments, in a second operating period following the first, there is a second test interval, in which the first and second actuators are not then measured, that is to say are arranged in the on tilt position. Other actuators are then measured, e.g. the third and/or fourth actuator.

In one non-limiting configuration relating to a situation in which the first actuator is in the on state and the second actuator is in the off state in the second operating period, said first actuator remains in the on tilt position and said second actuator is brought thereto for the second test interval. As also in the case of the configuration as per the main claim, this situation need not, of course, be adopted in all operating periods, but at least in some, also depending on the ratio of the light distribution to the respective test pattern.

In various non-limiting embodiments, the actuators are subdivided into groups in a gridlike manner and said groups are evaluated successively in a multiplicity of successive test intervals. The actuators are measured jointly per group; also cf. the above remarks in specific detail. For the test intervals, with regard to their respective duration, e.g. in relation to the respective operating period, the values mentioned above may then likewise be applicable. The grid may be constructed e.g. according to rows and columns (with at least two actuators per row and/or per column). However, a more complex grid configuration is also possible; the groups may be provided e.g. in each case inherently as polygon-shaped and in a manner supplementing one another in a planar fashion, for instance like a checkerboard or else a honeycomb grid. The groups may be predefined, that is to say that the grid configuration is then defined beforehand and is not altered depending on the groups evaluated to date. Measurement is then carried out, for example, until the field with the deviation has been found.

Generally, sequential measurement or scanning may be of interest in order to localize, e.g. defective actuators or groups of actuators. On the other hand, the evaluation may also allow a conclusion to be drawn about the light source itself. In various embodiments, the light source emits the illumination light at an emission surface with a spatial distribution, that is to say from a specific surface region. The irradiance need not necessarily vary over the surface region; it may e.g. also be substantially constant and have a so-called flat top profile. The spatial distribution on the emission surface may correlate with a spatial distribution on the array, that is to say that a respective region of the emission surface is assigned to a respective actuator (and vice versa). In various non-limiting embodiments, the illumination light is guided onto the array via an optical unit; for example, the emission surface is imaged onto the array.

In various non-limiting embodiments, the light source includes a pump radiation source and a phosphor element may be at a distance therefrom, whereby very high luminances may be realized. The phosphor element converts the pump radiation at least proportionally into a conversion light; the latter may form the illumination light by itself (full conversion) or else in a mixture with proportionally non-converted pump radiation (partial conversion). Even if pump radiation passes to the illumination application in this case, in contrast to the fault cases described this is generally non-critical because the proportionally non-converted pump radiation is fanned out, e.g. on account of scattering processes in the phosphor element. If the phosphor element is damaged, for instance fractured, or has fallen off completely, more and moreover focused pump radiation passes to the illumination application.

A laser source may be configured as pump radiation source, which laser source may e.g. also be constructed from a plurality of individual laser sources. In various non-limiting embodiments, a laser diode is provided as laser source or individual laser source. The phosphor element includes a wavelength-converting phosphor, e.g. cerium-doped yttrium aluminum garnet (YAG:Ce). The phosphor may be embedded e.g. in the form of particles into a matrix material, but it is also possible for agglomerated phosphor particles or else a single crystal of the phosphor to form the phosphor element. The illumination light is generally white light, which may be achieved e.g. with the YAG:Ce, which emits yellow conversion light, in the case of partial conversion with blue pump light.

The pump radiation is incident on an incidence surface of the phosphor element, and the conversion light is emitted at an emission surface. In general, operation in reflection is also possible, that is to say that the incidence surface and the emission surface may coincide; e.g. a mirror could then be arranged at the opposite side surface of the phosphor element. In various non-limiting embodiments, the phosphor element is operated in transmission, that is to say that the incidence surface and the emission surface lie opposite one another. At the incidence surface, a dichroic coating may be provided, for example, which is transmissive for the pump radiation incident thereon, but reflective for the conversion light thereupon generated in the phosphor element. The emission surface of the phosphor element constitutes the abovementioned emission surface of the light source, which may then be imaged onto the array.

In general, however, the illumination light is not necessarily white light, of course; it may e.g. also be colored light or even infrared light. Colored light, for instance red, green or blue light, may also be obtained by the combination of a laser source and a phosphor element. Generally, however, some other light source may also be provided, for instance an LED source, which may be constructed e.g. in a matrix like fashion.

In various non-limiting embodiments, in which the actuators are measured successively in groups, the number of actuators evaluated per iteration is reduced step by step and the deviation is thus localized. This is generally also possible in combination with a predefined, gridlike subdivision; in this case, however, a dynamic adaptation of the groups may be provided, that is to say that the actuators to be evaluated subsequently are determined according to the actuators evaluated to date. The number of actuators is reduced step by step, not necessarily from each iteration to the succeeding iteration, but across a plurality of iterations.

In various non-limiting embodiments, for localizing the deviation the array is subdivided into two halves, the deviation is assigned to one of the halves and this remaining half is again subdivided into two halves, that is to say that the array overall is then quartered. The deviation is then assigned once again, wherein the subdivision into halves (then $1/8$, $1/16$, $1/32$ etc.) may be continued until the deviation has been localized sufficiently accurately. If it is then ascertained, for example, that the deviation is not situated marginally (at the edge of the actuator arrangement) but rather borders a different half previously ruled out in the iteration, this may then also be resolved again separately in the same way by iterations. For the assignment to a half, actually the active area of the array, that is to say the area occupied by the actuators, is taken and divided into two parts having surface areas substantially equal in magnitude; by way of example, the surface areas are equal in magnitude (in general, however, e.g. the larger thereof could also deviate from the smaller one by not more than 15%, 10% or 5%). The halves may adjoin one another in a straight separating surface, that is to say, e.g. in the case of a rectangular active array surface, may be formed by the diagonal or one of the central axes of mirror symmetry of the rectangle.

In various non-limiting embodiments, in all these test intervals, irrespective of whether in the case of the predefined grids or the progressive "systematic localization", there are in each case actuators which, for the respective test interval, are arranged or move analogously to the first and second actuators in the first test interval. That is to say that may in each of the test intervals one or some actuators be brought from the on to the off tilt position (analogously to the first actuator) and one or some actuators may remain in the off tilt position (analogously to the second actuator). In various non-limiting embodiments, a test interval is accommodated in each operating period.

In various non-limiting embodiments, in each case a plurality of test intervals, that is to say at least two test intervals, are also accommodated at least in some of the successive operating periods. That is to say that two different patterns may then be measured within the same operating period. In various non-limiting embodiments, not more than five, four or three test intervals are accommodated in the same operating period.

In various non-limiting embodiments, the detected radiation power is compared with a setpoint value and a possible deviation is at least partly compensated for by an altered driving of the affected actuator(s) during further operation. This does not concern the case, which is otherwise also conceivable, of course, in which one or some of the actuators is or are completely disconnected (remain(s) switched off), for instance in the case of local damage to the phosphor element and a correspondingly local excessive increase in the pump radiation. During the compensation, by contrast, the actuators still continue to be operated, but a deviation is at least partly counteracted with this operation. If the corresponding pixel is e.g. darker than it actually ought to be, then the corresponding actuator in the on state may then correspondingly remain in the on tilt position for somewhat longer, that is to say conversely be brought to the off tilt position for a shorter time duration. In the case of an excessively bright pixel, the opposite situation obtains, that is to say that the actuator in the on state may be deliberately kept in the off tilt position for somewhat longer. To put it simply, a gray-scale value is thus adapted.

In various non-limiting embodiments, an entire light distribution may be stored as setpoint value, from which light distribution a respective setpoint value may thus be derived for each actuator or for each group of actuators. Said light distribution may be measured or be simulated as an alternative or else in a supporting manner; it may be recorded in the course of a calibration during the production of each individual illumination device, or alternatively be measured on a structurally identical type or an illumination unit from the same batch.

Various non-limiting embodiments also relate to a method for operating an illumination device described in the present case, wherein the radiation power incident on the sensor unit during the first test interval or else the further test intervals is detected by the sensor unit. Reference is expressly made to the above description; part of the method is then in particular also corresponding adjustment of the actuators.

Various non-limiting embodiments also relate to a use of the illumination device for illumination. Even though in general applications in the field of projection (video, cinema), in effect and entertainment lighting or else in the field of architainment are also conceivable, various non-limiting embodiments relate to the use of an illumination device disclosed in the present case for vehicle lighting, e.g. in a front headlight (in this case a plurality of illumination devices/array arrangements may also be combined in a headlight). In general, use in a ship or else airplane or helicopter is also conceivable, e.g. being given to a motor vehicle, e.g. an automobile. The road illumination may be adaptive, that is to say that e.g. other road users are selectively excluded from the illumination in order to avoid dazzle.

A solid angle volume which the illumination light cone may maximally fill is segmented, e.g. subdivided into rows and columns, and the only segments which are disconnected or reduced in their intensity are those in which the other road user was ascertained, e.g. another motor vehicle, or else a pedestrian or cyclist. In this case, actuators may also be combined in groups, e.g. with at least 10, 50, 100 actuators and (independently thereof) e.g. not more than 1000 or 500 actuators per group. By way of example, a cornering light may also be realized or objects (e.g. a wild animal at the edge of the roadway or else persons) may also be illuminated in a targeted manner, for instance for the purpose of marking (hazard identification).

In various non-limiting embodiments, the array is operated depending on a vehicle sensor measurement, e.g. depending on one or more camera images. The camera images may be subdivided in a manner corresponding to the segmentation of the maximally accessible illumination light cone, wherein each segment is then assigned one or more actuators of the array. If another road user is ascertained in a segment, the corresponding actuators are brought to the off state.

Figure 1:
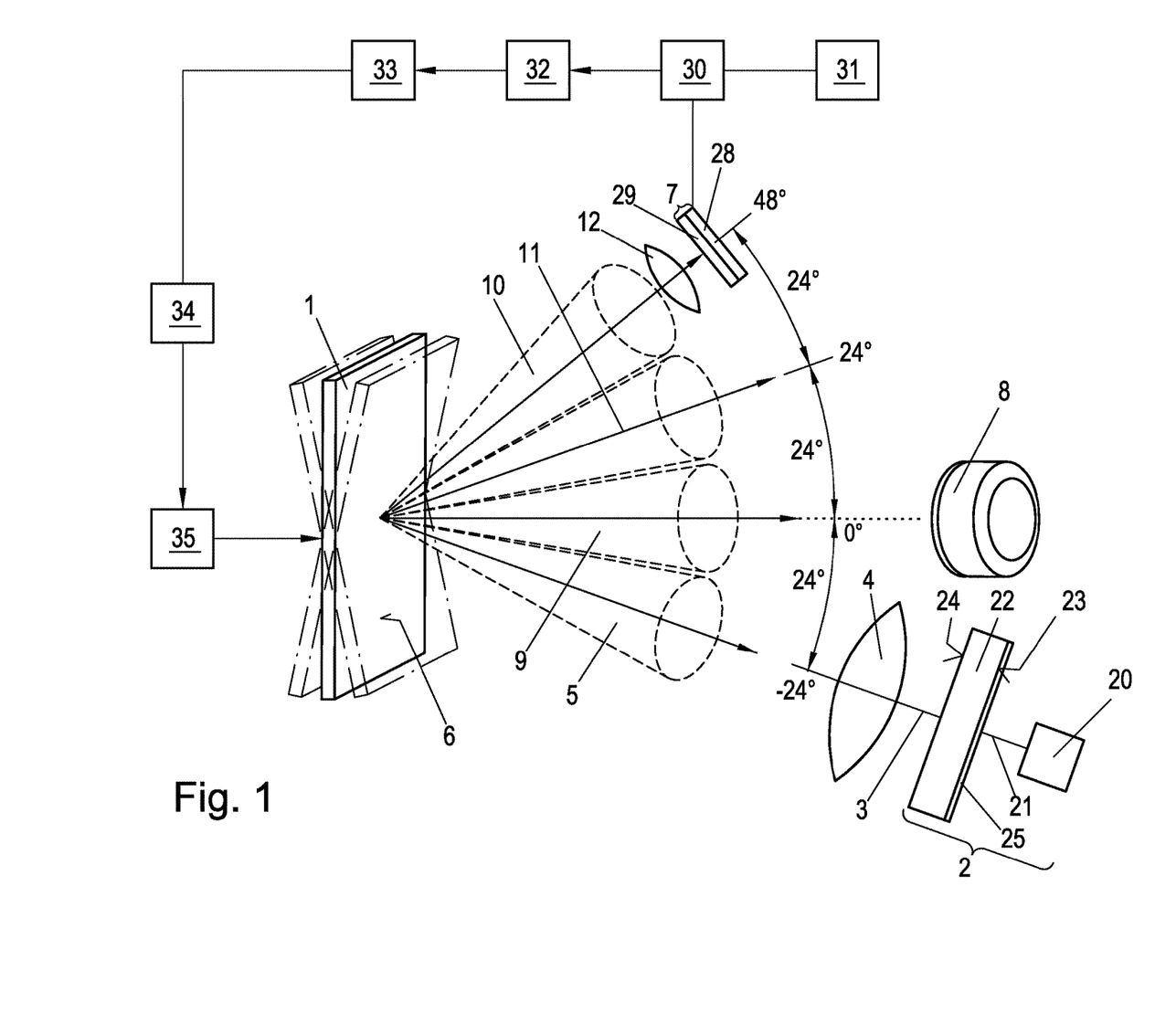
FIG. 1 shows an illumination device according to various non-limiting embodiments including a light source, an actuator of a micromirror array and a sensor unit.

FIG. 1 shows a schematic illustration of an illumination device according to various non-limiting embodiments including an array 35, of which one micromirror actuator 1 is shown by way of example and which is supplied with illumination light 3 by a light source 2. The illumination light 3 passes through a converging lens as feed optical unit 4 and is incident in the form of a feed beam 5 on the micromirror array 35. For illustration reasons, only one micromirror actuator 1 of the array 35 is shown; nevertheless, the fed/reflected light is illustrated on the basis of the beams, that is to say relative to the array 35 in its entirety.

The micromirror actuator 1 is illustrated in the non-deflected state. It is tillable back and forth between two maximum tilt positions, which are indicated by dashed lines. The non-deflected state is referred to as the transient flat state, and in the present case one maximum tilt position corresponds to the on tilt position, and the other to the off tilt position. In the off tilt position, according to various non-limiting embodiments, the micromirror actuator 1 reflects the illumination light incident on its mirror surface 6 onto a sensor unit 7. In the on tilt position, by contrast, the illumination light is guided through an illumination optical unit 8 (a lens system) and thus used in the present case for generating a light distribution in the far field, specifically for adaptive road illumination in a motor vehicle front headlight.

FIG. 1 furthermore illustrates how a total angle range of 96° that is accessible overall owing to the tiltability of the micromirror actuators 1 by +/−12° in the present case may be divided. In addition to the feed beam 5, the on beam 9 (to the illumination optical unit 8), the off beam 10 (onto the sensor unit 7) and the transient beam 11 are illustrated in said total angle range. The on beam 9 and the off beam 10 are spaced apart from one another by way of the transient beam 11 in order, for a good contrast, as far as possible to keep unintentional reflections from the on beam 9. Said reflections may occur to an increased extent in the transient flat state because the mirror surfaces of the actuators here lie parallel to the chip plane and reflections from the rest of the chip surface (connecting webs, metallization, etc.) may thus also be introduced.

In the case of the illumination device according to various non-limiting embodiments, the illumination light guided in the off beam 10 is not annihilated in an absorber (beam dump), which might otherwise be advantageous, if appropriate, with regard to optimizing contrast. Instead, the radiation is guided via a converging lens as sensor optical unit 12 on the sensor unit 7 and used for monitoring the state of the light source 2. This may provide an effect insofar as firstly monitoring of the light source 2 indeed becomes possible, yet secondly this means at least no significant loss of efficiency.

The light source 2 is constructed from a pump radiation source 20 and a phosphor element 22. A laser diode (a plurality of laser diodes are also possible) is provided as pump radiation source 20. The pump radiation 21 emitted thereby is blue laser light in the present case. The latter is incident generally in collimated form on a phosphor element 22 arranged at a distance therefrom, specifically on the incidence surface 23 of said phosphor.

In response to excitation with the pump radiation 21, the phosphor element 22 emits a conversion light, which proportionally forms the illumination light 3 and is emitted at the emission surface 24. The emission surface 24 is imaged onto the array by the feed optical unit 4. In the present case, the phosphor element includes YAG:Ce as phosphor; the conversion light is yellow light. The pump radiation 21 is only proportionally converted (partial conversion); a remaining part of the blue laser light in a mixture with the yellow conversion light forms white light as illumination light 3.

The phosphor element 22 is operated in transmission; the emission surface 24 lies opposite the incidence surface 23. In order to increase the efficiency, a dichroic coating 25 is provided at the incidence surface 23, said coating being transmissive for the pump radiation 21, but reflective for the conversion light. The phosphor element 22 is arranged on a carrier, e.g. composed of sapphire, this not being illustrated however. Even if in the present case proportionally non-converted pump radiation 21 passes to the illumination application, this is non-critical because the pump radiation 21 is fanned out in the course of radiating through the phosphor element 22, for instance on account of scattering processes, that is to say passes to the illumination application in a non-focused fashion.

Various fault cases are conceivable, however, in which a critical emergence of pump radiation 21 may occur on the application side. By way of example, the phosphor element 22 may fall off entirely from a carrier (not illustrated), but the collimated pump radiation may also already propagate through a crack/fracture of the phosphor element 22. The present illumination device is configured for detecting such a fault in order then to instigate in the fault case a switch-off of the pump radiation source 20 or an at least partial disconnection of the illumination over the array.

The sensor unit 7 includes a pump radiation sensor 28 with a wavelength-dependent filter 29. Through the latter only radiation in the wavelength range of the pump radiation 21 reaches the pump radiation sensor 28, not the conversion light. The pump radiation sensor 28, in the present case a photodiode, is thus configured for detection in the spectral range of the pump radiation as a result of the provision of the filter. In an analogous construction a conversion light sensor could also be provided (not illustrated), alternatively or else in combination with the pump radiation sensor 28. A sensor not provided with a filter is also possible.

If, in one of the fault cases, for example, more pump radiation then propagates in the feed beam 5 toward the array 35 and thus also in the off beam, the pump radiation sensor 28 detects an increased radiation power. By way of example, a switch-off of the pump radiation source may be instigated.

As is furthermore evident from FIG. 1, a read-out amplifier 30 attached to a supply 31 is assigned to the sensor unit 7. The amplified signal is fed to an A/D converter 32, that is to say is digitized. The digitized signal is checked in an evaluation unit 33, e.g. compared with a setpoint value. The block diagram in accordance with FIG. 1 should be understood to be schematic for illustrating a sequence; the A/D converter 32 and the evaluation unit 33 may e.g. also be embodied in an integrated fashion.

Depending on a result of the comparison with the setpoint value, the evaluation unit 33 communicates a corresponding command to a control unit 34 of the micromirror array 35. A different command may be implemented depending on the fault case or deviation. In this regard, e.g. in the case of an increased pump radiation, a complete disconnection of the affected actuators 1 may be instigated for safety reasons. Likewise, a corresponding command to a control unit (not illustrated) of the light source 2 may also instigate dimming (emergency operation) or else complete switching off. On the other hand, the command output to the control unit 34 of the array 35 may also instigate altered driving of some actuators, such that e.g. a deviation in the desired brightness value is compensated for (reference is made expressly to the explanations in the introductory part of the description).

Figure 2:
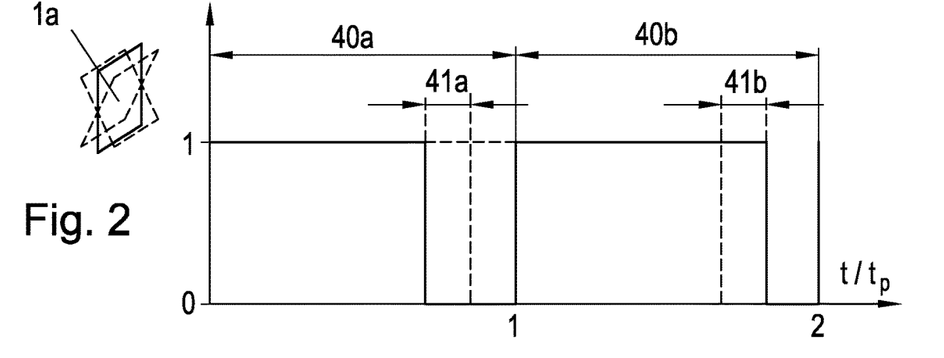
FIG. 2 shows the tilt positions of a first actuator during different operating periods over the course of time.
Figure 3:
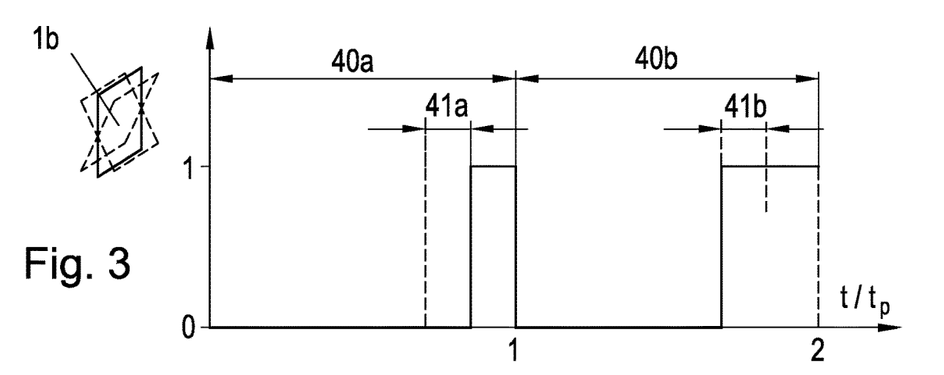
FIG. 3 shows the tilt positions of a second actuator during the operating periods in accordance with FIG. 2.

FIG. 2 and FIG. 3 illustrate in specific detail how and when the actuators are measured. In this case, FIG. 2 shows the tilt positions assumed by a first actuator 1a over the course of time, and FIG. 3 shows the tilt positions assumed by a second actuator 1b over the course of time. Operation is clocked with a frequency, that is to say a frame repetition of 60 Hz. Operating periods 40 resulting therefrom each have a time duration of around 17 ms. In both graphs, time is plotted on the x-axis, specifically in a manner normalized to the operating period duration $t_p$. On the y-axis in each case the tilt position is identified as 1 (on tilt position) or 0 (off tilt position).

The first actuator 1a is in the on state during the first operating period 40a, that is to say in any case largely over the first operating period 40a reflects the illumination light through the optical unit 8 toward the illumination application. In this respect, it thus contributes actively to the generated light distribution. As evident from FIG. 2, toward the end of the first operating period 40a the first actuator 1a is brought to the off tilt position (0) for a test interval 41a accommodated in the first operating period 40a. The first actuator 1a thus reflects the light to the sensor unit 7.

It is evident from FIG. 3, e.g. in joint consideration with FIG. 2, that the second actuator 1b is in the off state during the first operating period 40a; it is in the off tilt position (0). During the test interval 41a, the second actuator also remains in the off tilt position, that is to say is then measured jointly with the first actuator 1a. The first actuator 1a and the second actuator 1b are thus part of a group of actuators 1 which are measured jointly during the first test interval 41a. By way of example, in this regard reference is made to FIG. 4; the first and second actuators 1a,b could be e.g. part of the group of nine measured first in the field at the top left. In this example, a further seven actuators would thus be part of the group, which either are brought separately to the off tilt position analogously to the first actuator or remain in said off tilt position analogously to the second actuator 1b (also cf. the remarks in the introductory part of the description).

In a second operating period 40b, the first actuator 1a is once again in the on state, that is to say that it contributes actively to the light distribution. The second actuator 1b is once again in the off state, that is to say concomitantly determines the light distribution only passively. For illustration, relative to the motor vehicle road illumination: in a solid angle range assigned to the first actuator 1a light is required during the operating periods 40a,b shown here, whereas a solid angle range assigned to the second actuator 1b is excluded from the illumination, e.g. in order to avoid dazzling the occupants of a vehicle traveling ahead or an oncoming vehicle.

During operation according to various non-limiting embodiments, the measurement of the actuators 1 is carried out in a manner decoupled from the light distributions generated during the respective operating periods 40a,b. In this regard, during the first operating period 40a, the first and second actuators 1a,b are brought jointly to the off tilt position (0) in the first test interval 41a even though they are actually in different states, in order then to be measured jointly. In the second operating period 40b, the situation is reversed; specifically, the first and second actuators 1a,b are not intended to be measured during the second test interval 41b. Accordingly, the first actuator 1a in the on tilt position (1), may remain therein. The second actuator 1b is brought to the on tilt position for the second test interval 41b. For illustration, comparing this once again with FIG. 4, the second operating period 40b would correspond to the middle or right depiction, in which the first and second actuators 1a,b (which are situated in the top left quadrant, see above) are no longer measured.

It is evident from FIG. 2 and FIG. 3 that there is also a further, short inserted interval. This additional tilting is motivated by optimizing the lifetime of the array 35, and specifically prevents "baking" of the actuators 1 in the event of an excessively high thermal load. In the present case, this tilting interval is placed in each case at the end of the operating period 40a,b, after the respective test interval 41a,b. In contrast to the test intervals 41a,b, the light source 2 is briefly switched off in each case during the tilting interval, that is to say that the array 35 is not illuminated.

The division shown in FIG. 2 and FIG. 3 is by way of example; the test intervals 41a,b, by themselves or else jointly with the tilting intervals, could e.g. also in each case be placed at the beginning of the respective operating periods 40a,b or else be positioned centrally therein. The time duration ratios shown are also by way of example; e.g. in the case of a relatively high thermal load, the tilting intervals may also become longer and the light source 2 may remain switched off for longer.

In accordance with FIG. 2 and FIG. 3, a respective test interval 41a,b is accommodated in each of the operating periods 40a,b. Likewise, however, a further test interval or further test intervals could also be accommodated in each of the operating periods 40a,b or there may also be operating periods without a test interval, but this is not illustrated in specific detail for the sake of clarity. Reference is also made expressly to the introductory part of the description.

Figure 4:
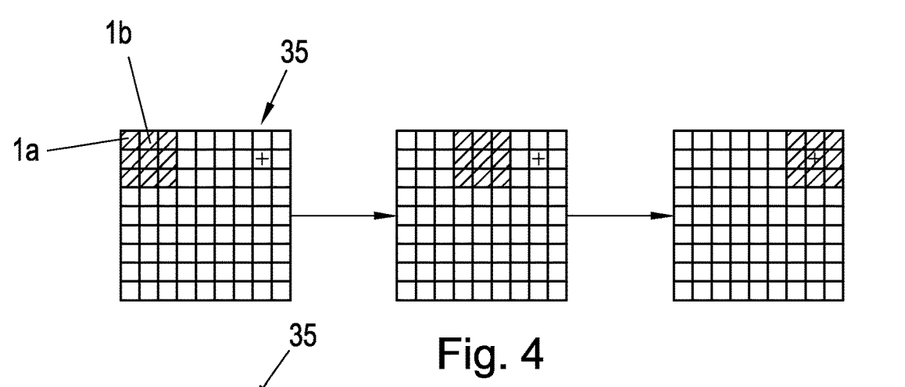
FIG. 4 shows a first possibility for sequentially evaluating the actuators of the micromirror array in successive test patterns.
Figure 5:
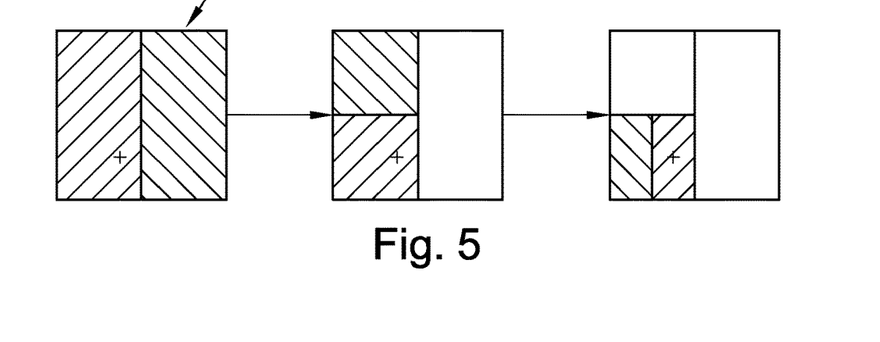
FIG. 5 shows a second possibility for sequentially evaluating the actuators of the micromirror array with sequential test patterns.

With reference to FIG. 4 and FIG. 5, an illustration is given below of how specific patterns or grids are measured successively with a multiplicity of such measurements which are performed in a multiplicity of successive test intervals 41 or operating periods 40.

In the case of FIG. 4, a predefined grid is placed over the array 35. The individual regions, that is to say the respectively assigned actuators, are measured successively, identified in each case by hatching (indicates the respectively measured region). In the present case, the defective location, identified by a plus symbol (+), is found during the third measurement; correspondingly fewer/further measurements would have to be carried out with a different arrangement.

In FIG. 4, the array 35 is subdivided into two halves, which are measured successively (in each case hatched, in different directions). In a next step, that one of the halves in which the deviation was ascertained (an increased radiation power) is then subdivided again into two halves, and the radiation power measured in these two halves is compared. This is continued until the defective location is localized with sufficient accuracy.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

LIST OF REFERENCE SIGNS

Micromirror actuator 1
First micromirror actuator 1a
Second Micromirror actuator 1b
Light source 2
Illumination light 3
Feed optical unit 4
Feed beam 5
Mirror surface 6
Sensor unit 7
Illumination optical unit 8
On beam 9
Off beam 10
Transient beam 11
Sensor optical unit 12
Pump radiation source 20
Pump radiation 21
Phosphor element 22
Incidence surface 23
Emission surface 24
Coating (dichroic) 25
Pump radiation sensor 28
Filter (wavelength-dependent) 29
Read-out amplifier 30
Supply 31
A/D converter 32
Evaluation unit 33
Control unit 34
Micromirror array 35
Operating periods 40
First operating period 40a
Second operating period 40b
Test intervals 41
First test interval 41a
Second test interval 41b

What is claimed is:

1. An illumination device, comprising:
a light source for emitting an illumination light;
a micromirror array having a plurality of micromirror actuators, which are switchable in each case between an on state and an off state in successive operating periods;
an illumination optical unit; and
an optical sensor unit;
wherein the illumination light emitted by the light source is guided onto the micromirror array and proportionally at a respective one of the micromirror actuators
in an on tilt position is configured to reflect the illumination light via the illumination optical unit to an illumination application; and
in an off tilt position is configured to reflect the illumination light to the optical sensor unit;
wherein the illumination device is configured for operation in such a way that a first of the micromirror actuators, in an on state in the on tilt position in a first of the operating periods, is brought to the off tilt position for a first test interval accommodated in the first operating period; and
a second of the micromirror actuators, in an off state in the off tilt position in the first operating period, remains in the off tilt position for the first test interval;
wherein a radiation power incident on the sensor unit during the first test interval is detected by the sensor unit; and
wherein the detected radiation power is configured to be compared with a setpoint value and a possible deviation is at least partly compensated for by an altered driving of the affected micromirror actuator(s) during further operation.

2. The illumination device as claimed in claim 1, wherein a time duration of the first test interval is in a ratio of at most 1:5 with respect to a time duration of the first operating period.

3. The illumination device as claimed in claim 1, wherein the operating periods each have a time duration from at least 5 ms to at most 100 ms.

4. The illumination device as claimed in claim 1, wherein the first test interval has a time duration from at least 50 µs to at most 500 µs.

5. The illumination device as claimed in claim 1, wherein the light source is configured to be switched off temporarily in the course of operating of the illumination device.

6. The illumination device as claimed in claim 5, wherein the light source is switched off temporarily during the first operating period outside the first test interval and the first micromirror actuator remains in the off tilt position in the first operating period beyond the first test interval.

7. The illumination device as claimed in claim 1, wherein a third of the micromirror actuators to be in an on state in the on tilt position in the first operating period, is configured to remain in the on tilt position for the first test interval; and
a fourth of the micromirror actuators in an off state in the off tilt position in the first operating period, is configured to be brought to the on tilt position for the first test interval.

8. The illumination device as claimed in claim 1, wherein
a second test interval is configured to be accommodated in a second operating period, which follows the first operating period; and
the first micromirror actuator and the second micromirror actuator are arranged in the on tilt position during the second test interval.

9. The illumination device as claimed in claim 8, wherein
the first micromirror actuator, in the on state in the on tilt position during the second operating period, is configured to remain in the on tilt position for the second test interval; and
the second micromirror actuator, in the off state in the off tilt position during the second operating period, is configured to be brought to the on tilt position for the second test interval.

10. The illumination device as claimed in claim 1,
configured for evaluation in such a way that the micromirror actuators are subdivided into groups in a gridlike fashion;
wherein the groups are evaluated successively in a multiplicity of successive test intervals, specifically the micromirror actuators of the respective group jointly per test interval.

11. The illumination device as claimed in claim 10,
wherein the successive test intervals are accommodated in each case in a multiplicity of successive operating periods.

12. The illumination device as claimed in claim 11,
wherein a plurality of test intervals in each case are arranged in at least some of the successive operating periods.

13. A method for operating an illumination device, the illumination device comprising:
a light source for emitting an illumination light;
a micromirror array having a plurality of micromirror actuators, which are switchable in each case between an on state and an off state in successive operating periods;
an illumination optical unit; and
an optical sensor unit;
wherein the illumination light emitted by the light source is guided onto the micromirror array and proportionally at a respective one of the micromirror actuators
in an on tilt position is configured to reflect the illumination light via the illumination optical unit to an illumination application; and
in an off tilt position is configured to reflect the illumination light to the optical sensor unit;
wherein the illumination device is configured for operation in such a way that a first of the micromirror actuators, in an on state in the on tilt position in a first of the operating periods, is brought to the off tilt position for a first test interval accommodated in the first operating period; and
a second of the micromirror actuators, in an off state in the off tilt position in the first operating period, remains in the off tilt position for the first test interval;
wherein a radiation power incident on the sensor unit during the first test interval is detected by the sensor unit;
the method comprising:
detecting a radiation power incident on the sensor unit during the first test interval by the sensor unit; and
comparing the detected radiation with a setpoint value and at least partially compensating for a possible deviation by altering driving of the affected micromirror actuator(s) during further operation.

14. A motor vehicle headlight for adaptive road illumination which involves excluding other road users from the illumination in order to avoid dazzle, the motor vehicle comprising:
an illumination device, comprising:
a light source for emitting an illumination light;
a micromirror array having a plurality of micromirror actuators, which are switchable in each case between an on state and an off state in successive operating periods;
an illumination optical unit; and
an optical sensor unit;
wherein the illumination light emitted by the light source is guided onto the micromirror array and proportionally at a respective one of the micromirror actuators
in an on tilt position is configured to reflect the illumination light via the illumination optical unit to an illumination application; and
in an off tilt position is configured to reflect the illumination light to the optical sensor unit;
wherein the illumination device is configured for operation in such a way that a first of the micromirror actuators, in an on state in the on tilt position in a first of the operating periods, is brought to the off tilt position for a first test interval accommodated in the first operating period; and
a second of the micromirror actuators, in an off state in the off tilt position in the first operating period, remains in the off tilt position for the first test interval;
wherein a radiation power incident on the sensor unit during the first test interval is detected by the sensor unit; and
wherein the detected radiation power is configured to be compared with a setpoint value and a possible deviation is at least partly compensated for by an altered driving of the affected micromirror actuator(s) during further operation.

15. The motor vehicle headlight as claimed in claim 14,
wherein the micromirror actuators of the micromirror array are configured to be selectively brought to the on or off tilt position depending on a measurement by a vehicle sensor.

16. The motor vehicle headlight as claimed in claim 15,
wherein the micromirror actuators of the micromirror array are configured to be selectively brought to the on or off tilt position depending on a measurement by a camera.

* * * * *